Figure 1:
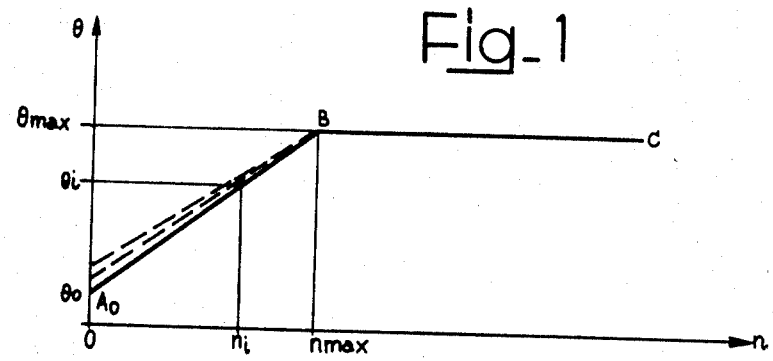

United States Patent
Palazzetti et al.

[15] 3,705,573
[45] Dec. 12, 1972

[54] ELECTRONIC TIMING SYSTEM FOR INTERNAL COMBUSTION ENGINE

[72] Inventors: Mario Palazzetti; Bruno Cavallarin, both of Turin, Italy

[73] Assignee: Fiat Societa per Azioni, Turin, Italy

[22] Filed: Dec. 18, 1970

[21] Appl. No.: 99,379

[30] Foreign Application Priority Data

Dec. 31, 1969 Italy..................54585 A/69

[52] U.S. Cl.......123/146.5 A, 123/148 E, 123/149 R
[51] Int. Cl..........................F02p 5/04, F02p 5/08
[58] Field of Search............123/148 E, 149, 146.5 A

[56] References Cited

UNITED STATES PATENTS

| | | |
|---|---|---|
| 3,314,407 | 4/1967 | Schneider..........................123/148 E |
| 3,447,521 | 6/1969 | Piteo..................................123/148 E |
| 3,465,739 | 9/1969 | Burson...............................123/148 E |
| 3,524,438 | 8/1970 | Janisch..............................123/149 C |
| 3,554,179 | 1/1971 | Burson.............................123/146.5 A |
| 3,521,611 | 7/1970 | Finch...............................123/146.5 A |

*Primary Examiner*—Laurence M. Goodridge
*Assistant Examiner*—Cort R. Flint
*Attorney*—Sughrue, Rothwell, Mion, Zinn & Macpeak

[57] ABSTRACT

An electronic timing system for an internal combustion engine provides an angle of advance which increases linearly with the engine speed up to a maximum angle of advance, at which it remains despite any increase in engine speed.

7 Claims, 11 Drawing Figures

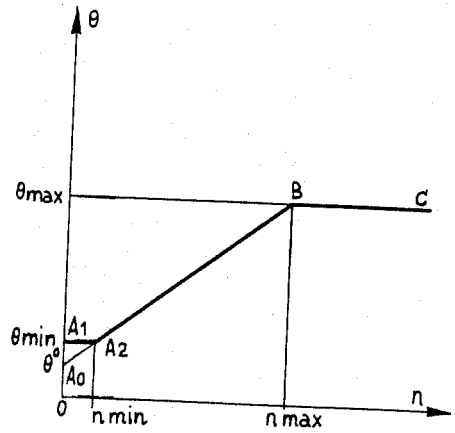
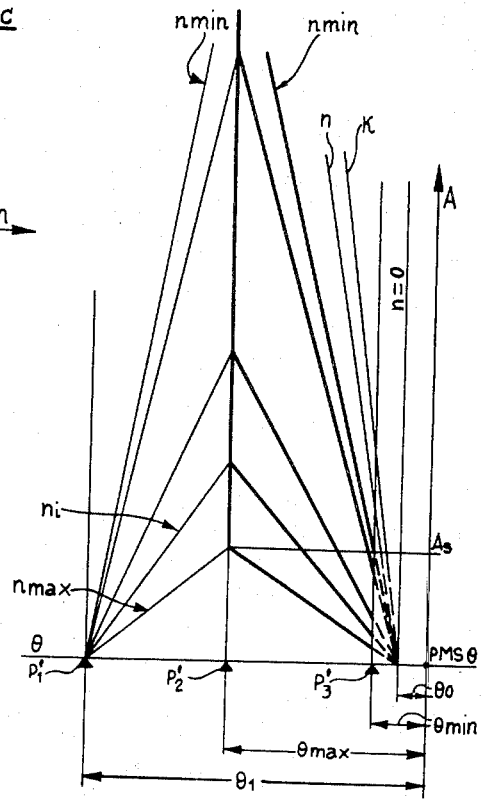
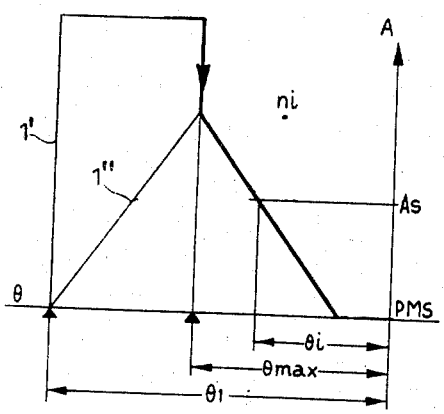

3,705,573

ELECTRONIC TIMING SYSTEM FOR INTERNAL COMBUSTION ENGINE

The present invention relates to an electronic timing system for internal combustion engines, which is adapted to deliver to an ignition circuit the command signal for starting the ignition.

In electronic timing systems the aforesaid command signal is equivalent to the electrical pulse which in the case of conventional ignition by means of a breaker arm is generated at the instant of opening of the points or contacts.

A main object of the invention is to provide an electronic timing system which is adapted to supply the command signal at a constant angle of advance having a predetermined maximum value, when the engine is running at high speeds, and at an angle of advance which is variable in accordance with a predetermined law, when the engine is running at low or medium speeds.

In particular this object also includes the provision of a system with fixed minimum advance.

Another object of the invention is to provide a timing system which permits the maximum and minimum speeds of the engine, above and below which the advance is to remain constant at the predetermined maximum and minimum values respectively, to be changed in a simple manner, and which also enables the course of the law of advance to be very easily regulated in dependency on relevant physical magnitudes and engine parameters.

A further object of the invention is to provide a timing system which operates with absolute precision and stability in time and comes into operation promptly so that the advance is instantaneously bound to the speed to the engine.

According to the invention the aforesaid objects are achieved by means of an electronic timing system which consists in detecting information corresponding to two angular positions of the driving shaft, the first of these positions corresponding to an angle of advance greater than the predetermined maximum angle ($\theta$ max) and the second corresponding to the predetermined maximum angle of advance ($\theta$ max), in using this information to obtain signal wave forms each comprising a rising section beginning in the aforesaid first angular position, a descending section beginning in the aforesaid second angular position and a peak which starts from the point of intersection of the two sections, and in comparing a threshold signal with the peak or with the descending section of the wave form to obtain a command signal which permits ignition and which is at a constant angle of advance ($\theta$ max) when the threshold signal intersects the peak, and has a variable advance ($\theta_i$) when the threshold signal intersects the descending section.

According to another aspect of the invention it is also possible to detect information corresponding to a third angular position of the driving shaft corresponding to the predetermined minimum angle of advance, in order to set a predetermined advance for engine speeds below the minimum speed corresponding to the said predetermined minimum advance.

Further features and advantages of the electronic timing system will appear from the following description and accompanying drawings given solely by way of example and relating to a preferred embodiment of the invention.

Figure 2:
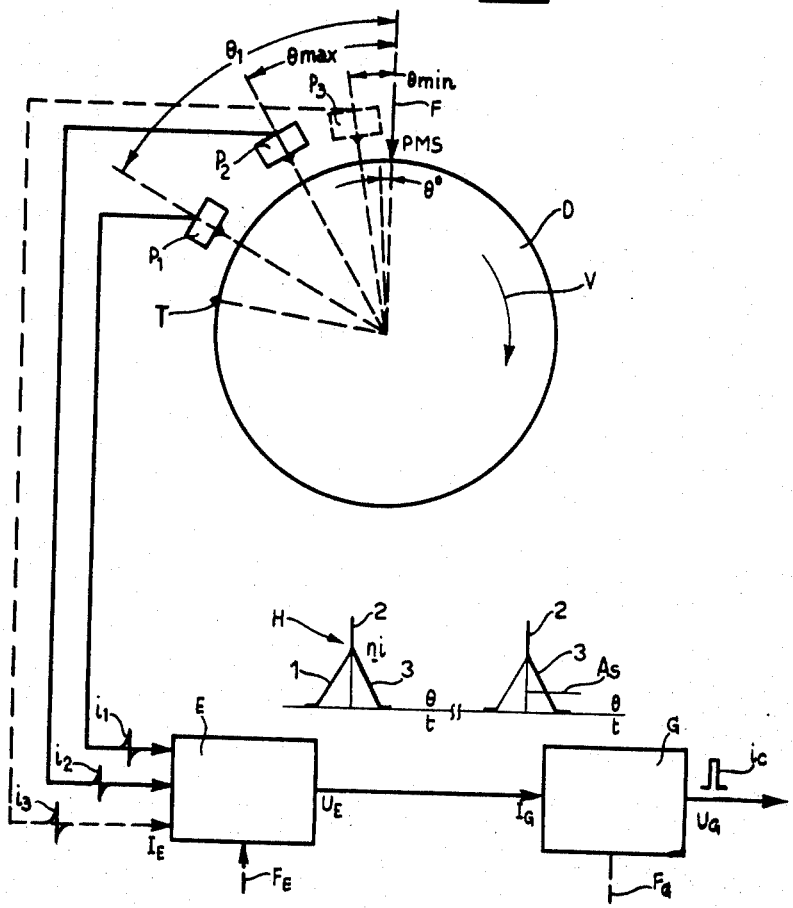
Figure 3:
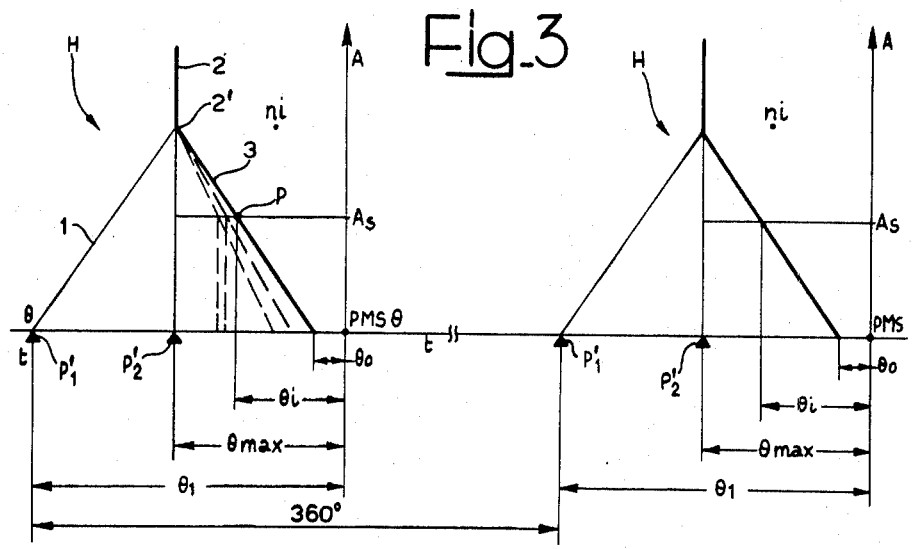
Figure 4:
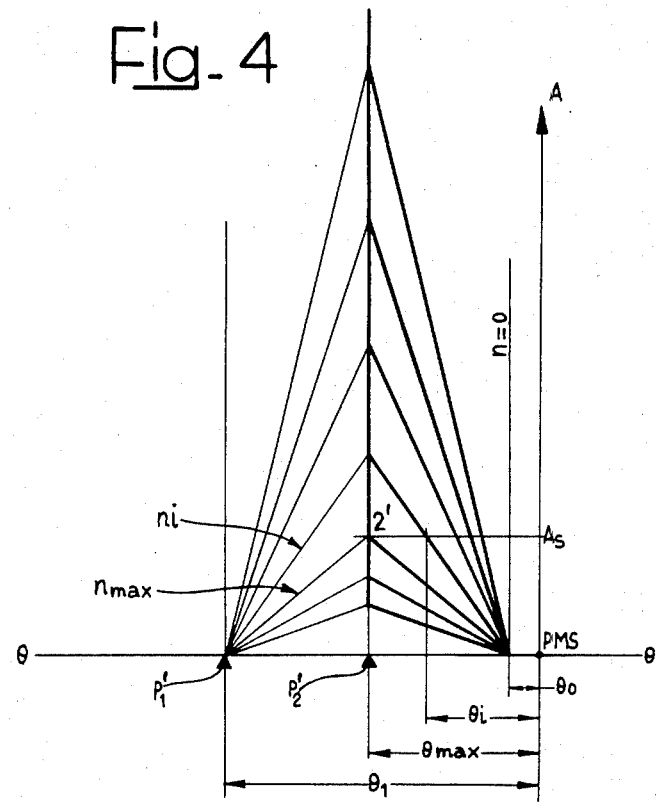
Figure 6:
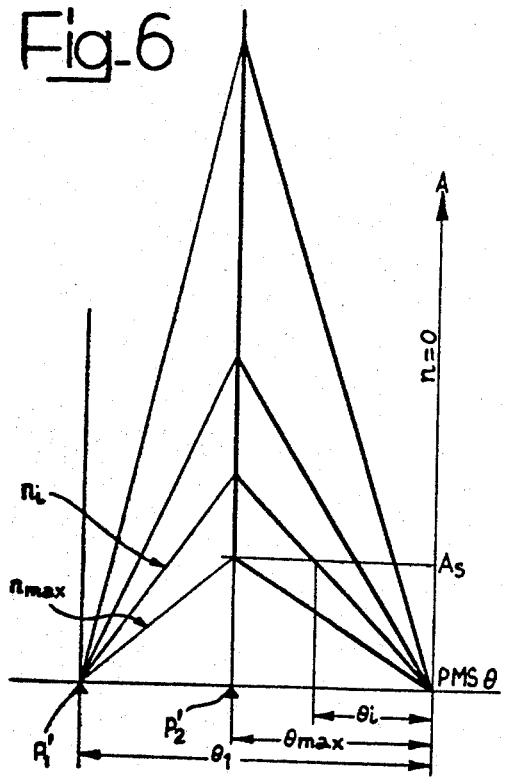
Figure 5:
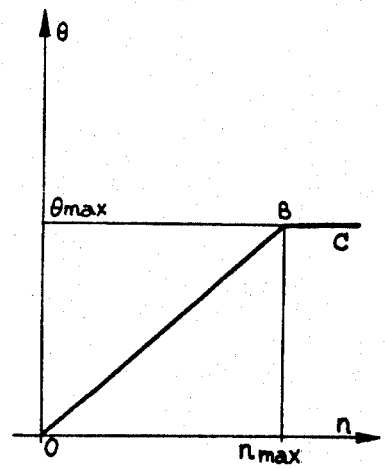
Figure 7:
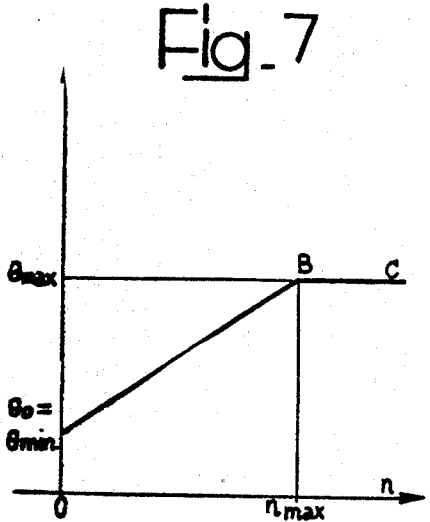
Figure 8:
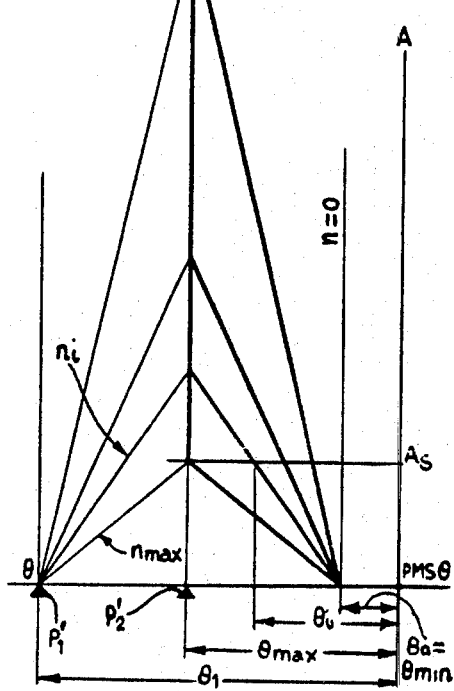

FIG. 1 shows a general timing curve obtained by plotting the angle of advance $\theta$ as a function of the engine speed, FIG. 1), FIG. 3), FIG. 2 diagrammatically illustrates an apparatus for carrying the timing system of the invention into effect, FIG. 3 shows a wave form of the signal produced by the apparatus in one cycle, with variation of the angle of advance $\theta$, for a given engine speed $n_i$, FIG. 4 shows various wave forms of the apparatus with variation of the engine speed, FIG. 5 shows a timing curve similar to that of FIG. 1, FIG. 6 is a diagram similar to FIG. 4, explaining the timing curve of FIG. 5, FIG. 7 shows another timing curve of the type shown in FIG. 1, FIG. 8 is a diagram similar to FIG. 4, explaining the timing curve of FIG. 7, FIG. 9 shows a variant of the timing curve of FIG. 1, FIG. 10 is a diagram similar to FIG. 4, explaining the timing curve of FIG. 9, and FIG. 11 shows a manner of operation for obtaining the rising side of the wave form.

With reference to FIG. 1, $A_oBC$ shows the timing curve which it is required to produce by means of the timing system of the invention.

It is assumed that in the section $A_oB$ there is linear variation of the advance or a constant advance time, and in the section BC the advance is constant; therefore, as soon as the engine attains and exceeds a predetermined speed $n_{max}$ there is a constant advance having a predetermined maximum value $\theta_{max}$ whereas when the speed is lower than this the advance varies proportionally to the speed and finally assumes the value $\theta_o$ when $n=0$.

The apparatus of FIG. 2 which is adapted to produce timing of the type shown in FIG. 1 consists essentially of a rotary member D rigidly connected to the driving shaft, at least two information detectors $P_1$ and $P_2$ arranged in fixed positions near the periphery of this member and co-operating with a reference means T, and an electronic unit consisting of a signal processor and generator E and a threshold and command signal generator G. The rotary member D may be of any suitable kind provided that it is driven synchronously by the driving shaft. It may be the flywheel or the engine shaft itself. The reference means T may also be of any type that is suitable with respect to the type of detectors $P_1$ and $P_2$ used. The function of T is to activate the detectors when it passes them.

If, as is assumed, $P_1$ and $P_2$ are of the electromagnetic type, then T is a magnetic stud. There is only one stud, because a single-cylinder engine is being considered. The arrow F indicates the angular position of the top dead point PMS; this position is fixed with respect to the rotary member D; the angle V indicates the direction of rotation of this member.

$\theta_1$ and $\theta_{max}$ indicate the angular positions (or distances) of advance, with respect to PMS, at which the first and second detectors $P_1$ and $P_2$ respectively are placed. As shown, $\theta_1$ is greater than $\theta_{max}$ which is the predetermined maximum advance in the curve of FIG. 1. $\theta_o$ is a general angle determined by the position of the point $A_0$ in FIG. 1. This angle may vary between zero and $\theta_{max}$.

The output of the detectors is applied to the input $I_E$ of the processor E, and the output $U_E$ of the processor is applied to the input $I_G$ of the generator G. Finally, the output $U_G$ of G is applied to an electronic ignition circuit not shown in the drawing. This circuit may for instance be as described in Italian Pat. application No. 53602/69 of the Oct. 7 1969, also in the name of the present applicant.

For purposes which will be specified hereinafter, the apparatus may be provided with a third detector $P_3$, shown in broken lines, which is placed in the angular position $\theta_{min}$ which is the predetermined minimum advance corresponding to the minimum engine speed ($n_{min}$).

Similarly, the output of $P_3$ is also connected to the input $I_E$ of the processor E. As shown in broken lines by the arrows $F_E$ and $F_G$, the processor E and generator G may have other inputs. Let us now consider the operation of the apparatus on the assumption that the engine is running at a constant speed $n_i$ and also that the third detector $P_3$ and the additional inputs $F_E$ and $F_G$ are not present.

As stated, the timing to be produced is that shown in FIG. 1. During the rotation of the member D, when the stud T passes under the first detector $P_1$ a first signal $i_1$ is sent to the input $I_E$ of the processor E, and subsequently a second signal $i_2$ is sent to this input when T passes under $P_2$.

The effect of these two signals is that at the output $U_E$ of E there is a signal varying as a function of $\theta$ or of the time $t$ and having the wave shape diagrammatically indicated by H and comprising an increasing section 1, a decreasing section 3 and a peak 2 which starts from the point of intersection of the two sections. At the input $I_G$ of the generator G the wave form H is compared with a threshold signal $A_s$ produced by this generator, and the projection of the point of intersection of this threshold with the peak 2 or with the descending section 3 on to the $\theta$ axis determines the advance at that engine speed and therefore the instant at which the command signal $i_c$ is sent by G to the ignition circuit to start the ignition. With reference to FIG. 1 the advance $\theta_i$ will correspond to the constant engine speed $n_i$.

For further clarification of the manner of operation, let us consider FIG. 3 which shows the wave form H on a larger scale.

The amplitude A of the signal is plotted along the axis of ordinates and the advance $\theta$ is plotted along the axis of abscissae which is also the axis of times t. The angular distances of the reference points $P'_1$ and $P'_2$ from the upper dead point PMS are respectively $\theta_1$ and $\theta_{max}$. These therefore represent the angular positions of the driving shaft with respect to PMS at the instants at which the signals $i_1$ and $i_2$ are applied to the input of the processor E. The angle $\theta_o$ is determined by the point $A_o$ in FIG. 1; $A_s$ is the threshold signal having a predetermined value.

When the first signal $i_1$ reaches $I_E$ (stud T under $P_1$), the processor E produces an increasing signal starting from the point $P_1$, represented by the section 1. When the second signal $i_2$ arrives (stud T under $P_2$), the processor produces at $P'_2$ the peak 2 and, starting from the lowest point 2' of this peak, a decreasing signal indicated by the section 3, which tends to become zero at $\theta_o$. The peak 2 consists of a pulse signal of extremely short duration. The point 2' of this peak constitutes the point of intersection of the sections 1 and 3.

In the wave form shown, the threshold signal $A_s$ produced by G is compared with the decreasing section 3 and the projection of the point of intersection P of the two straight lines $A_s$ and 3 on to the axis of abscissae defines the advance $\theta_1$ and therefore the instant at which the command signal $i_c$ is sent.

When there is only one stud T as assumed above, after 360° the cycle is repeated identically. When the speed varies, the wave forms at the output of the processor E will differ successively from one another and each will correspond to a particular speed, as shown in FIG. 4 in which $n_{max}$ indicates the wave form corresponding to engine speed $n_{max}$ and $n_i$ indicates the general form corresponding to speed $n_i$.

From the diagram shown in FIG. 4 it can be seen that the wave form corresponding to $n_{max}$ represents the boundary of separation between waves forms corresponding to a higher speed, which are located below it, and those corresponding to a lower speed, which are located above it. The threshold signal $A_s$ will therefore meet the various wave forms at different points, and the advance at the various speeds will be indicated by the projections of these points of intersection on to $\theta$.

If the speed of the engine is equal to or greater than $n_{max}$, the line representing the signal $A_s$ will respectively through the vertex 2' of the $n_{max}$ wave form or above it, and in each case the line will intersect a peak so that the angle of advance will be the maximum angle $\theta_{max}$. In this case the constant advance section BC of the curve of FIG. 1 will be produced.

If on the other hand the speed is less than $n_{max}$, the line $A_s$ will intersect the descending section of the wave form corresponding to the speed in question, and the advance will be between $\theta_o$ and $\theta_{max}$. Therefore the other section $A_oB$ of the curve of FIG. 1, in which the advance is variable, will be produced.

From the foregoing description it is seen that the part of each wave form that participates in determining the advance is represented by the peak 2 and the descending section 3.

Consequently, the choice of the value of $A_s$ is related to the speed $n_{max}$ above which a constant advance $\theta_{max}$ is required. It can in fact be seen in FIG. 4 that the line $A_s$ of given height always intersects a peak in the case of wave forms below those corresponding to $n_{max}$.

If $\theta_o$ is varied between zero and $\theta_{max}$, that is to say if the position of the point $A_o$ in FIG. 1 is varied (cf. broken lines in FIG. 1), the slope of the section 3 of the wave form will vary accordingly (cf. broken lines in FIG. 3), so that while $A_s$ remains the same it is possible to have different advances for the same speed.

Thus, as shown in FIGS. 5 and 6 the angle $\theta_o$ may be zero and therefore the descending sections of the wave form are directed towards PMS. Alternatively, $\theta_o$ may be equal to the predetermined minimum advance $\theta_{min}$ for $n=0$, as shown in FIGS. 7 and 8, in which case the descending sections of the wave forms are directed towards $\theta_{min}$.

Furthermore, in an arrangement which is very important in practice and is shown in FIGS. 9 and 10, the advance curves may tend towards the general angle $\theta_o$ which is less than $\theta_{min}$ but the conditions may be made that when the engine speed is below the minimum speed $n_{min}$ to which the predetermined minimum advance $\theta_{min}$ corresponds, the advance remains fixed and equal to the said minimum $\theta_{min}$.

The course of the advance curve $A_1$–$A_2$–B of FIG. 9 represents this situation, and in order to produce this curve the apparatus shown in FIG. 2 must also be provided with the third detector $P_3$ placed at a distance $\theta_{min}$ from PMS as stated above. Accordingly, the reference point P'3 shown on the axis of abscissae $\theta$ in FIG. 10 corresponds to the angular position of the driving shaft in which the stud T is under $P_3$ and the third signal $i_3$ is applied to the input of the processor E.

The effect of this signal is that at the output $U_E$ of E the descending sections of the wave forms are interrupted at P'3 (cf. FIG. 10), so that the minimum advance $\theta_{min}$ is set for engine speeds which are below the minimum and for which the corresponding wave forms are forms such as $n_k$ located above $n_{min}$.

$\theta_{min}$ could of course also be set, at the minimum speed, in the case of the timing system shown in FIGS. 5 and 6. In FIG. 6, P'3 would be located between P'2 and PMS. On the other hand it would be unnecessary to provide the third detector $P_3$ in the case of FIGS. 7 and 8.

It is clear that when the third detector is used it is also possible to vary the value of $\theta_{min}$. For this purpose it is only necessary to displace $P_3$ round D into the angular position with respect to PMS that corresponds to the required minimum advance.

Solely for the purpose of clarity of exposition, the preceding description of the timing system of the invention has been concerned with arrangements in which the advance varies proportionally to the angular speed of the engine, and it has been seen that in this case various advance curves having a linear course can be easily obtained by suitable selection of $A_s$, $\theta_o$, $\theta_{min}$ and the like.

Of course, the principles set forth also remain valid in cases in which the advance varies in accordance with any predetermined law in the range of low and medium speeds.

Instead of being predetermined, both the timing curve and the height of the threshold signal could be automatically varied during operation, in dependency on certain physical parameters of the engine. It is for this purpose that the inputs $F_E$ of E and $F_G$ of G of the apparatus shown in FIG. 2 are used. Signals dependent on the temperature of the engine, the degree of vacuum in the intake duct, the position of the throttle and the like could be applied to these inputs.

The electronic apparatus comprising E and G may be of any suitable known type provided that it is capable of processing, producing and comparing signals as described hereinbefore.

The increasing signal produced by the processor E on the arrival of $i_1$ and diagrammatically represented by the section 1 in FIGS. 2 and 3 could consist of a plurality of signals adapted to attain a certain level at $\theta_{max}$, with the final result of giving place to the peak 2 and the descending section 3 on the arrival of $i_2$.

Thus for example this result could be achieved by the superposition of two signals of which one is a square wave signal 1' and the other is a signal 1" of which the course shows a linear increase, as shown in FIG. 11.

A final consideration concerns the information detectors and the reference stud on the rotary member D.

As an alternative to the system illustrated, it would be possible to provide a single detector and a plurality of studs carried by the rotary disc D.

What we claim is:

1. A method of generating a signal for controlling the angle of advance in an ignition circuit comprising the steps of:

a. detecting the rotation of a drive shaft past a first predetermined point, said first predetermined point being a first predetermined angle from the top dead point of said drive shaft;

b. detecting the rotation of said drive shaft past a second predetermined point, said second predetermined point being a second predetermined angle from said dead point wherein said first predetermined angle is greater than said second predetermined angle;

c. generating a first signal which varies in a first predetermined manner as a function of time, wherein the generation of said first signal is initiated by the detection of the rotation of said drive shaft past said first predetermined point;

d. stopping the generation of said first signal by the detection of the rotation of said drive shaft past said second predetermined point;

e. generating a pulse signal having a minimum amplitude equal to the maximum amplitude of said first signal, wherein said pulse signal is generated by the detection of the rotation of said drive shaft past said second predetermined point;

f. generating a second predetermined signal which varies in a second predetermined manner as a function of time, wherein the generation of said second predetermined signal is initiated when said pulse signal reaches its minimum value, and wherein said second predetermined signal decreases to zero when said drive shaft rotates past a third predetermined point which is in advance of or at the dead point of said drive shaft;

g. generating a threshold signal having an amplitude equal to the minimum value of said pulse signal when the drive shaft is rotating at a predetermined maximum speed;

h. determining the point at which said threshold signal intersects said second signal;

i. generating a command signal in accordance with the intersection of said threshold signal and said second signal when said drive shaft is rotating at a speed less than said predetermined maximum speed;

j. using said command signal to advance the ignition timing wherein the advance of said ignition timing increases as the speed of said drive shaft increase until the speed of said drive shaft reaches the predetermined maximum speed and the advance of said ignition timing is constant when said drive shaft rotates at a speed greater than said predetermined maximum speed.

2. The method as set forth in claim 1, further comprising:

a. detecting the rotation of said drive shaft past a fourth predetermined point, said fourth predetermined point being a fourth predetermined angle from said dead point wherein said fourth predetermined angle is less than said second predetermined angle;

b. stopping the generation of said second signal upon the detection of said fourth predetermined point if said second signal is greater than zero, wherein said fourth predetermined point corresponds to the minimum angle of advance of said ignition circuit wherein said minimum angle of advance is the angle of advance for all engine speeds below a predetermined minimum speed.

3. The method as set forth in claim 1, further including varying said first and second signals and/or said threshold signal as a function of a physical condition and/or an engine parameter.

4. The method as set forth in claim 1, wherein said first and second signals are linear.

5. An ignition timing system for advancing the timing in an ignition system in accordance with an increase in speed of an engine, said system comprising:

a. first detecting means for detecting the rotation past a first predetermined point of a mark on the engine drive shaft, and for producing an output upon the occurrence thereof;

b. second detecting means for detecting the rotation of said mark past a second predetermined point and for producing an output upon the occurrence thereof;

c. signal processing and generating means coupled to said first and second detecting means, for producing a first increasing signal upon the receipt of the output of said first detecting means, a pulse signal having a minimum amplitude equal to the amplitude of said first increasing signal upon the receipt of the output of said second detecting means, and a second decreasing signal upon the return of said pulse signal to its minimum value.

d. threshold generating means for generating a threshold signal;

e. comparator means for comparing said second decreasing signal with said threshold signal and for producing a command signal upon the coincidence of said second decreasing signal and said threshold signal, wherein said command signal initiates the firing of said ignition system.

6. The system as set forth in claim 5, further comprising means for varying the output of said threshold generating means and/or said comparator means in accordance with variations in physical conditions and/or engine conditions.

7. The system as set forth in claim 6, wherein said first increasing signal comprises a square wave component and a linearly increasing component superimposed thereon.

* * * * *